US008386508B2

(12) United States Patent
Krishnamoorthy et al.

(10) Patent No.: US 8,386,508 B2
(45) Date of Patent: Feb. 26, 2013

(54) SYSTEM AND METHOD FOR PARALLEL QUERY EVALUATION

(75) Inventors: Srikumar Krishnamoorthy, Chennai (IN); Shanmugavel Sadasivam, Pondicherry (IN); Aakanksha Gagrani, Bhilwara (IN); Prahalad Haldhoderi Achutharao, Bangalore (IN)

(73) Assignee: Infosys Technologies Limited (IN)

( * ) Notice: Subject to any disclaimer, the term of this patent is extended or adjusted under 35 U.S.C. 154(b) by 401 days.

(21) Appl. No.: 12/431,296

(22) Filed: Apr. 28, 2009

(65) Prior Publication Data
US 2009/0271385 A1 Oct. 29, 2009

(30) Foreign Application Priority Data

Apr. 28, 2008 (IN) .......................... 1046/CHE/2008

(51) Int. Cl.
*G06F 17/30* (2006.01)
(52) U.S. Cl. ................. 707/764; 707/759; 707/769
(58) Field of Classification Search ................. 707/764, 707/759, 769
See application file for complete search history.

(56) References Cited

U.S. PATENT DOCUMENTS

| 5,590,319 A | * | 12/1996 | Cohen et al. | ........................... 1/1 |
| 5,742,806 A | * | 4/1998 | Reiner et al. | ........................... 1/1 |
| 6,289,334 B1 | * | 9/2001 | Reiner et al. | ........................... 1/1 |
| 6,345,267 B1 | * | 2/2002 | Lohman et al. | ........................... 1/1 |
| 7,472,112 B2 | * | 12/2008 | Pfleiger et al. | ........................... 1/1 |
| 2005/0131877 A1 | * | 6/2005 | Ghosh et al. | ....................... 707/3 |
| 2006/0218123 A1 | * | 9/2006 | Chowdhuri et al. | .............. 707/2 |

* cited by examiner

*Primary Examiner* — John E Breene
*Assistant Examiner* — Joshua Bullock
(74) *Attorney, Agent, or Firm* — Lerner, David, Littenberg, Krumholz & Mentlik, LLP

(57) ABSTRACT

A method and system for parallel query processing is provided. The method includes estimating a number of subqueries that may be formed corresponding to an input query. The method further includes fragmenting the input query into a plurality of sub queries by adding one or more filter predicates to the input query without altering the semantics of the input query. Further, processing of the sub queries is scheduled. Thereafter, one or more query execution plans are generated and processed. Following the processing of the query execution plans, the results of the processed sub queries are collated, aggregated and presented in a required format.

16 Claims, 4 Drawing Sheets

| RANGER_ID | DBNAME | TABLENAME | KEY_TYPE | ACTIVE_KEY | RANGE_START | RANGE_END | VALUE |
|---|---|---|---|---|---|---|---|
| 1 | BANKING | CUST_DETAILS | I | ACCOUNT_NO | 1000 | 8700 | X |
| 2 | BANKING | EMP_MANAGER | I | EMP_ID | 2000 | 30000 | X |
| 3 | BANKING | CUST_LOAN | I | LOAN_NO | 3900 | 4500 | X |
| 4 | BANKING | CUST_DETAILS | C | ACCOUNT_TYPE | 0 | 0 | SAVINGS;CURRENT |
| 5 | BANKING | CUST_DETAILS | C | BANK_BRANCH | 0 | 0 | BANGALORE;CHENNAI;PUNE; |
| 6 | BANKING | CUST_TRANSACTION | C | TRANS_TYPE | 0 | 0 | DEPOSIT;WITHDRAWAL |
| 7 | BANKING | CUST_TRANSACTION | D | TRANS_DATE | 0 | 0 | 2005-1-1;2007-8-9; |
| 8 | BANKING | ORDERS | N | PRICE | 100.00 | 2540.50 | X |

FIG. 2

SYSTEM AND METHOD FOR PARALLEL QUERY EVALUATION

FIELD OF INVENTION

The present invention is directed towards providing a parallel query processing framework. More particularly, the present invention provides a system and method for dynamically fragmenting a query into multiple sub-queries, executing individual sub-queries over a grid network, aggregating the sub-query results and streaming the query results to users.

BACKGROUND OF THE INVENTION

Conventionally, enterprises employ a method involving extracting, transforming and loading data from disparate operational systems into data warehouses in order to integrate the data for the purpose of reporting and business analytics. However, this method is time consuming and leads to delays in operational activities as well as in making strategic decisions.

Hence, the demand for a method of real time integration of data from heterogeneous sources is increasing at a rapid pace. However, integrating data obtained from disparate/heterogeneous data sources in real-time is a computationally challenging task as it involves fast query evaluation. In order to achieve real time scalable data integration use of parallel query processing techniques is required.

Conventionally available methods and solutions for parallel query processing make use of knowledge of underlying database partitions for fast query evaluation. Hence, most of the available methods for real time integration of data obtained from heterogeneous data sources are limited by the number of partitions built on the underlying database. Such methods are not suitable when no partitioning exists in the underlying databases. Further, while using the currently available partitioning based solutions for integration of data obtained from disparate databases with overlapping partitions may significantly reduce the query processing efficiency.

Consequently, there is need for a system and method of real time scalable integration of data obtained from heterogeneous databases which does not require knowledge of underlying database partitions. There is need for a parallel query processing solution which is fast, efficient and makes no assumptions regarding partitions built on the underlying databases.

SUMMARY OF THE INVENTION

The invention provides a system for parallel query processing. The system comprises a query fragment identifier module for estimating a number of sub-queries that may be formed corresponding to an input query based on a number of query evaluator nodes available for processing the input query and processing characteristics of the available query evaluator nodes, the query evaluator nodes accessing one or more databases being referenced by the input query for processing the input query; a query splitter module for fragmenting the input query into a plurality of sub queries by adding one or more filter predicates to the input query without altering the semantics of the input query; a scheduler for scheduling the processing of the sub queries; a result aggregator module for aggregating results of the processed sub queries; a streaming module for streaming results of the processed sub queries; and a metadata manager for storing processing characteristics of the one or more query evaluator nodes and information regarding the one or more databases being referenced by the input query.

In an embodiment of the present invention, the system for parallel query processing further comprises a plurality of query optimizer nodes for generating optimal query plans comprising one or more query partitions for processing the fragmented input query. In various embodiments of the present invention, the input query is written in a structured query language. Further in various embodiments of the present invention, the query fragment identifier module estimates the number of sub-queries that may be formed corresponding to the input query as equal to a number of healthy query evaluator nodes available for processing the input query; a query evaluator node being selected as healthy based on memory required for storing each record of a predetermined table of a predetermined database being referenced by the input query and available memory and processing speed of the evaluator node.

In an embodiment of the present invention, the scheduler schedules the sub queries for processing by using a round robin algorithm. The metadata manager is updated periodically and comprises a machine characteristics repository and a database characteristics repository. The database characteristics repository stores physical and logical metadata information corresponding to the one or more databases being referenced by the input query; logical metadata information comprising information regarding schema of the one or more databases being referenced by the input query; physical metadata information comprising information regarding statistics of the one or more databases being referenced by the input query. In an embodiment of the present invention, the database characteristics repository stores names of the one or more databases being referenced by the input query, names of the one or more tables being referenced by the input query, attribute names obtained from the one or more tables being referenced by the input query as active keys, data types of the active keys, and ranges of the active keys.

The invention also provides a method for parallel query processing comprising the steps of: estimating a number of sub-queries that may be formed corresponding to an input query; fragmenting the input query into a plurality of sub queries by adding one or more filter predicates to the input query without altering the semantics of the input query; scheduling the processing of the sub queries; generating one or more query execution plans comprising one or more query partitions corresponding to each sub query; processing the generated one or more query execution plans; and collating, aggregating and presenting results of the processed sub queries in a required format.

In an embodiment of the present invention, the method for parallel query processing further comprises the step of streaming the results of the processed sub queries in a required format. The step of estimating a number of sub-queries that may be formed corresponding to an input query comprises the steps of: parsing the input query and extracting one or more query attributes for obtaining references to one or more databases and tables corresponding to the input query; selecting a first database that corresponds to at least one of the extracted attributes and table combination as a base database; selecting a table from the base database based on a number of records contained in the table; computing memory required for storing the selected table; obtaining available memory and processing speed of each evaluator node available for processing the input query; selecting an evaluator node available for processing the input query as a healthy evaluator node if the available memory corresponding to the evaluator node is greater than or equal to half of the computed and if the processing speed of the evaluator node is greater than a predetermined threshold; and estimating a number of sub-queries that may be formed corresponding to the input query as the number of selected healthy evaluator nodes.

The step of fragmenting the input query into a plurality of sub queries by adding one or more filter predicates to the input query without altering the semantics of the input query comprises the steps of: classifying the input query into query sub-segments; determining suitability of the input query for fragmentation by analyzing the query sub-segments; determining if a 'where' sub-segment of the input query comprises an 'OR' operation and does not comprise a 'group-by' operator; fragmenting the input query into one or more sub queries by using the 'OR' operator if the 'where' sub-segment of the input query comprises an 'OR' operation and does not comprise a 'group-by' operator; and fragmenting the input query into one or more sub queries by using an active key of the database table being referenced by the input query if the 'where' sub-segment of the input query comprises an 'OR' operation and does not comprise a 'group-by' operator.

BRIEF DESCRIPTION OF THE ACCOMPANYING DRAWINGS

The present invention is described by way of embodiments illustrated in the accompanying drawings wherein:

FIG. 2 illustrates an exemplary structure of database characteristics repository of the metadata manager;

DETAILED DESCRIPTION OF THE INVENTION

A system and a method for parallel query processing are described herein. Input queries are processed in a parallel mode by identifying the number of sub-queries the input query may be fragmented into, fragmenting the input query, processing the sub-queries, aggregating the sub-query results and streaming the query results. The present invention does not require underlying databases being referenced by the input queries to be partitioned. The method of the invention may be provided on a computer readable medium.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
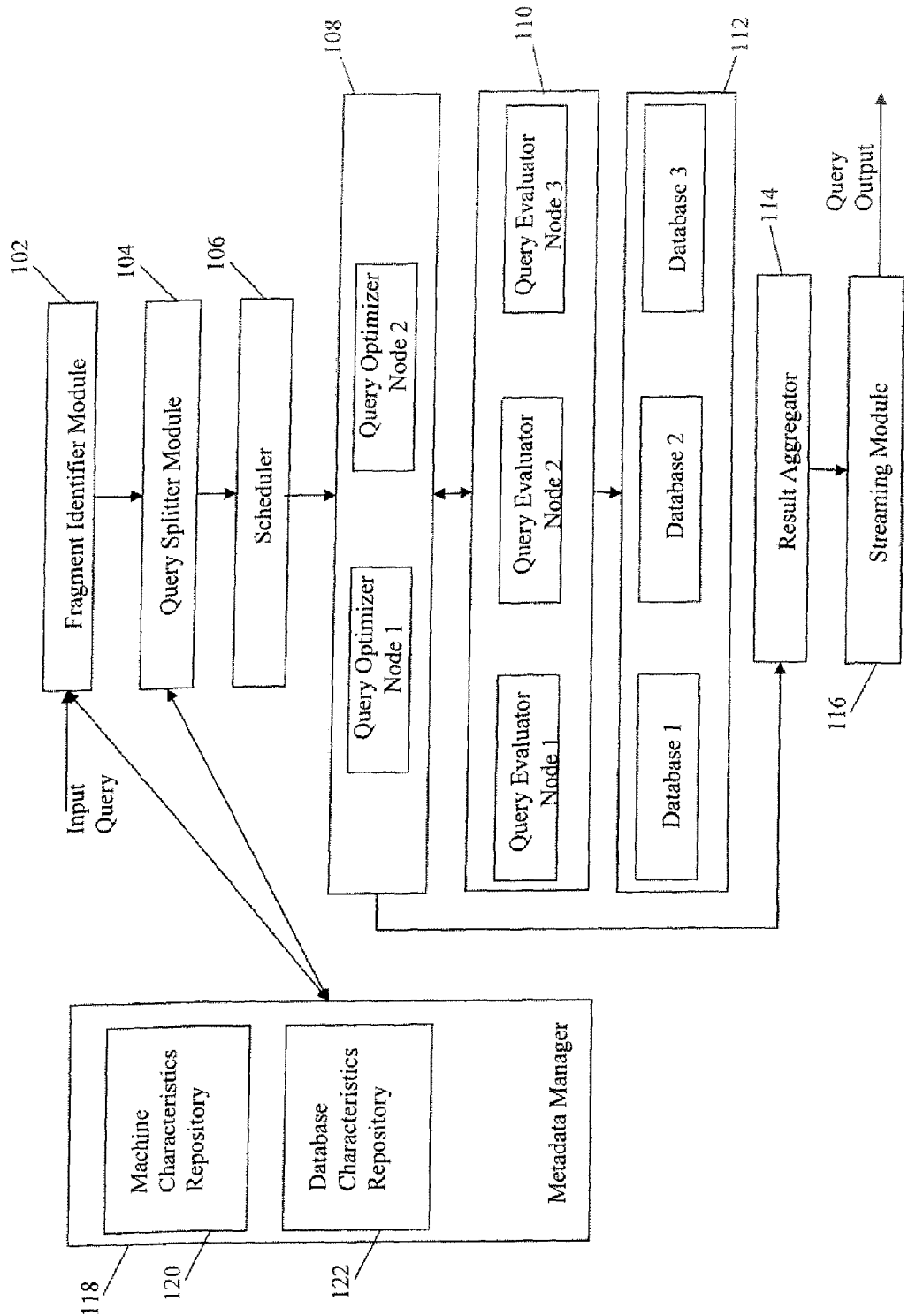
FIG. 1 is a block diagram depicting a system for parallel query evaluation.

FIG. 1 is a block diagram depicting a system for parallel query evaluation. System 100 comprises a query fragment identifier (QFI) module 102, a query splitter (QS) module 104, a scheduler 106, a plurality of query optimizer nodes 108, a plurality of query evaluator nodes 110, one or more databases 112, a result aggregator (RA) module 114, a streaming module 116 and a metadata manager 118. Metadata manager 118 comprises a machine characteristics repository 120 and a database characteristics repository 122.

QFI module 102 estimates a near optimal number of sub-queries that may be formed corresponding to an input query. In various embodiments of the present invention, the input query may be written in any query language known in the art. In the following disclosure an exemplary embodiment of the present invention where an input query is submitted in a structured query language (SQL) format has been described. In other embodiments, various other database query languages known in the art may be used. The number of sub-queries that may be formed is dependent on the number of query evaluator nodes 110 available for processing the input query as well as the processing characteristics of the query evaluator nodes 110, such as the available processor speed and memory. Query evaluator nodes 110 comprise any computing devices that may process the input query by accessing the required one or more databases 112.

The input query is parsed and the query attributes are extracted. The extracted attributes are used to obtain references to one or more databases 112 and tables corresponding to the query. Information regarding the one or more databases 112 and tables corresponding to the query is stored in the database characteristics repository 122 of the metadata manager 118. In an embodiment of the present invention, a first database that corresponds to at least one of the extracted attribute(s) and table combination is selected as a base database. The base database is used for computation of a near optimal number of sub-queries that may be formed corresponding to the input query and a table selected from the base database. In an embodiment of the present invention, a table from base database is selected based on maximum number of records. In other embodiments, various other heuristic methods may be applied to select a table from base database. The selected base database and table is used for splitting the input query into multiple sub-queries.

QFI module 102 computes the number of healthy query evaluator nodes 110 available for processing the input query. In various embodiments of the present invention, the near optimal number of sub-queries that may be formed corresponding to the input query is equal to the number of healthy query evaluator nodes 110 available for processing the input query. The health of an evaluator node 110 is computed by using data such as the memory for storing each record of the selected table of the base database, and the available memory and processing speed of the evaluator node 110.

In an embodiment of the present invention, the total memory required for storing a selected table, is computed as:

$$\text{Memory required} = \text{record size} * (\text{number of tuples}/\text{number of evaluator nodes}) \quad (1)$$

where, record size depicts the maximum row size of the selected table;

number of tuples depicts the total number of rows in the selected table; and number of evaluator nodes depicts the total number of evaluator nodes 110 available for processing the input query.

The available memory and processor speeds of all the evaluator nodes 110 available for processing the input query is stored in the machine characteristics repository 120 of the metadata manager 118. Machine characteristics repository 120 is updated periodically. Once the total memory required for storing a selected table is computed by using Equation (1) the available memory and processor speeds of all the evaluator nodes 110 available for processing the input query are dynamically obtained from machine characteristics repository 120. An evaluator node 110 is considered to be healthy if the available memory corresponding to it is greater than or equal to half of the computed required memory and if its processor speed is greater than fifty percent. In an embodiment of the present invention, if none of the evaluator nodes 110 satisfy the sufficient memory and processor requirement then the number of sub-queries that may be formed corresponding to the input query is equal to the total number of evaluator nodes 110.

FIG. 2 illustrates an exemplary structure of database characteristics repository 122 of the metadata manager 118. In an embodiment of the present invention, the database characteristics repository 122 of the metadata manager 118 is updated periodically. The column titled 'Ranger_ID' 202 stores unique identifier of entries in the database characteristics repository 122. The column titled 'DBNAME' 204 stores names of all databases that may be referenced by an input query. The column titled 'TABLENAME' 206 stores names of all tables that may be referenced by an input query. The column titled 'ACTIVE_KEY' 208 stores attribute names obtained from the corresponding tables. In an embodiment of the present invention, the attribute names stored under the head 'ACTIVE_KEY' 208 are the primary keys of the corresponding tables. The column titled 'KEY_TYPE' 210 stores the data type of the corresponding active keys. The data types may be stored as 'I' depicting integer type, 'N' depicting numeric type, 'C' depicting character domain type and 'D' depicting date type. The columns titled 'RANGE_START' 212 and 'RANGE_END' 214 store the minimum and maximum values respectively of the active keys where the data type of the active keys is either integer (I) or numeric (N). The column titled 'VALUE' 216 stores the domain value of the active keys where the data type of the active keys is either character (C) or Date (D).

For example with reference to FIG. 2, in row 218, the figure stored in the column titled 'Ranger_ID' is '1' depicting the first entry in the database characteristics repository 122. The database name is 'Banking', the table name is 'CUST_DETAILS', the active key is the 'ACCOUNT_No' attribute of the table 'CUST_DETAILS', the data type of the active key is 'I' depicting integer type and the minimum and maximum values respectively of the active key 'ACCOUNT_No' are '1000' and '8700' respectively. In row 220, the figure stored in the column titled 'Ranger_ID' is '4' depicting the fourth entry in the database characteristics repository 122. The database name is 'Banking', the table name is 'CUST_DETAILS', the active key is the 'ACCOUNT_TYPE' attribute of the table 'CUST_DETAILS', the data type of the active key is 'C' depicting character domain type, the minimum and maximum values respectively of the active key 'ACCOUNT_TYPE' are null and the value of the active key may be 'Savings' or 'Current'. In row 222, the value stored in the column titled 'Ranger_ID' is '7' depicting the seventh entry in the database characteristics repository 122. The database name is 'Banking', the table name is 'CUST_TRANSACTION', the active key is the 'TRANS_DATE' attribute of the table 'CUST_TRANSACTION', the data type of the active key is 'D' depicting date type, the minimum and maximum values respectively of the active key 'TRANS_DATE' are null and the value of the active key may be '2005-1-1' or '2007-8-9'.

In an embodiment of the present invention, database characteristics repository 122 of the metadata manager 118 comprises physical and logical metadata information corresponding to underlying databases 112. Logical metadata information comprises information regarding the schema of a database such as table names, column names, referential keys, etc. Physical metadata information comprises information regarding database statistics such as number of tables in a database, number of rows in a table, number of columns in a table, cost of database access, index access cost, etc.

With reference to FIG. 1, QS module 104 fragments the input query into multiple sub-queries. The input query is fragmented by adding a filter predicate in a manner such that the semantics of the input query are not altered. The filter predicate is added to the input query by using an active key corresponding to the table and database being referenced by the input query. Information regarding the active key, table name and database name is obtained by the QFI module 102 from the database characteristics repository 122 of the metadata manager 118.

QS module 104 fragments the input query into multiple sub-queries thereby enabling scheduler 106 to evenly distribute the processing load among the plurality of query optimizer nodes 108. In an embodiment of the present invention, the allocation of sub-queries to the query optimizer nodes 108 is done by scheduler 106 in a Round-Robin fashion. The scheduler 106 also sends information about each of the healthy evaluator nodes 110 identified by QFI module 102 to the query optimizer nodes 108. The optimizer nodes are computing devices that generate optimal query plans for execution of the fragmented input query. Optimal query plans may be generated by using any of the query plan generation algorithms commonly known in the art. In various embodiments of the present invention, optimizer nodes 108 perform functions such as determining an efficient join ordering plan, join algorithm types and access paths, generating parallel plans for query execution, and scheduling the query plan for execution. The query plans generated by the optimizer nodes may have one or more query partitions. One or more query partitions are generated since the input query may reference multiple databases 112 dispersed geographically. Scheduler 106 re-schedules sub-queries, if any of the optimizer nodes 108 fails during execution of a sub-query, thereby providing a fault-tolerant system. The re-scheduling is performed without any manual intervention. In an exemplary scenario, where all the optimizer nodes 108 fail to execute, the input query is not executed and in various embodiments user intervention may be required.

Each of the generated query partitions are scheduled for execution on the evaluator nodes 110. Evaluator nodes 110 parse each of the query partitions and execute individual operators such as table scan operator, hash join operator, project operator, aggregation operator, exchange operator etc., occurring in the partition. Evaluator nodes 110 execute the query partitions by connecting to one or more databases 112 for performing table scan operation, by performing joining of tables defined in the hash join operator, and by federating with one or more other query evaluator nodes 110 for exchanging the data specified in the exchange operator.

In an embodiment of the present invention, the allocation of sub-queries to the healthy evaluator nodes 110 is done by scheduler 106 in a Round-Robin fashion. Scheduler 106 re-schedules sub-queries, if any of the healthy evaluator nodes 110 fails during execution of a sub-query, thereby providing a fault-tolerant system. In an exemplary scenario where an input query which has not been fragmented fails to execute on an evaluator node to which it is allocated, scheduler 106 allocates the query to a next available evaluator node. The re-allocation or re-scheduling is performed without requiring manual intervention. In another exemplary scenario, where multiple sub-queries fail to execute scheduler 106 allocates the queries to a re-run queue from which the failed sub-queries are re-scheduled on the next available evaluator node. In yet another exemplary scenario, where all the available evaluator nodes 110 fail to execute, the input query is not executed and in various embodiments user intervention may be required.

RA module 114 collects the results of all the executed sub-queries, aggregates the results and presents them in a required format. Streaming module 116 provides a result set streaming feature where the result is streamed to the client as and when received, without waiting for the complete result set to be received. Hence streaming module 116 provides an improved throughput of the query evaluation.

Figure 3:
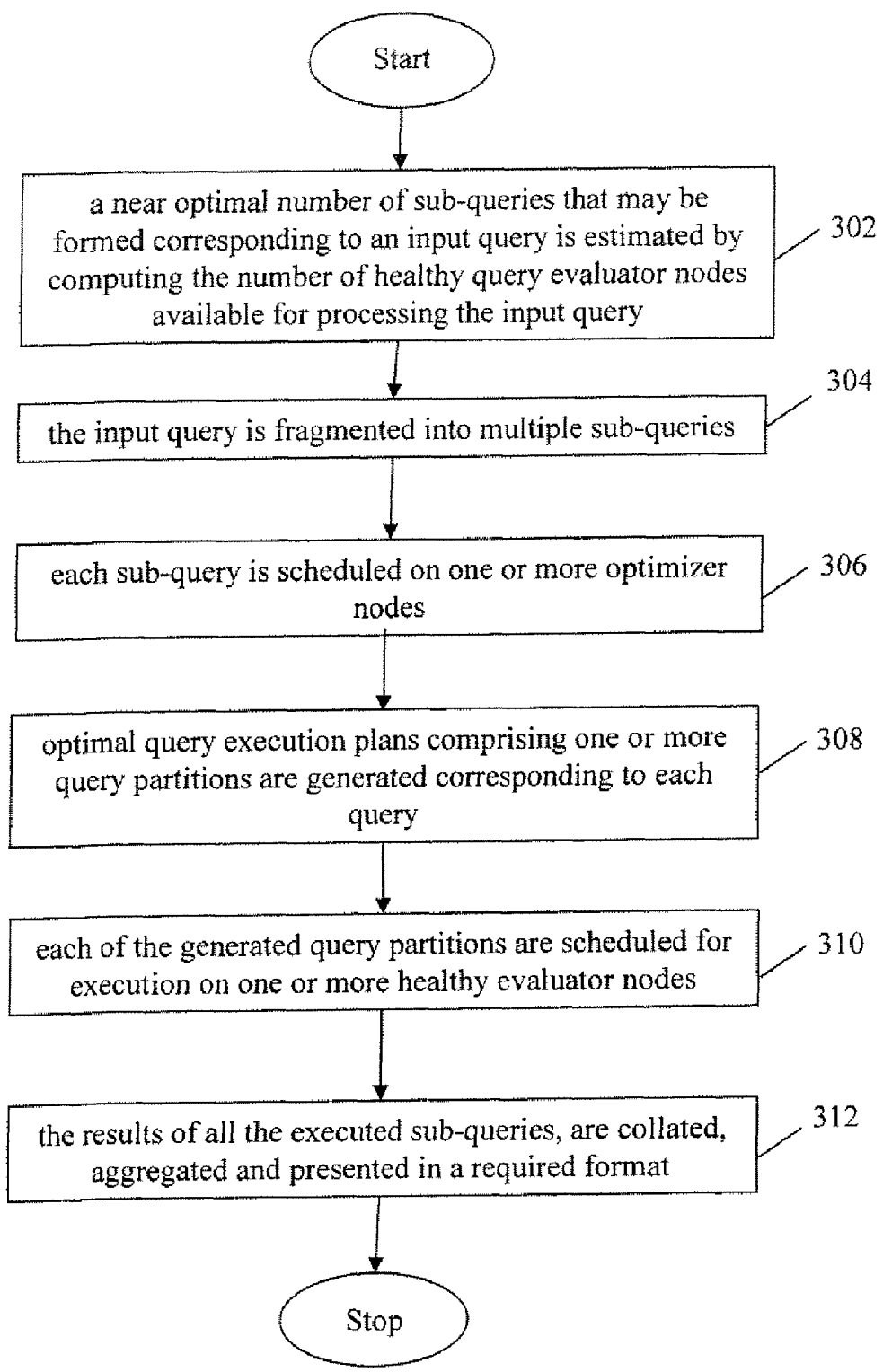
FIG. 3 is a flowchart illustrating a method for parallel query evaluation.

FIG. 3 is a flowchart illustrating a method for parallel query evaluation. At step 302 a near optimal number of sub-queries that may be formed corresponding to an input query is estimated by computing the number of healthy query evaluator nodes available for processing the input query. The input query is parsed and the query attributes are extracted. The extracted attributes are used to obtain references to one or more databases and tables corresponding to the query. In an embodiment of the present invention, a first database that corresponds to at least one of the extracted attribute(s) and table combination is selected as a base database. A table selected from the base database, comprising the maximum number of records, is used for splitting the input query into multiple sub-queries. The health of each evaluator node available for processing the input query is computed by using data such as the memory for storing each record of the selected table of the base database, and the available memory and processing speed of the respective evaluator node. In an embodiment of the present invention, the total memory required for storing a selected table, is computed by using Equation (1) provided with reference to FIG. 1. The available memory and processor speeds of all the evaluator nodes available for processing the input query are dynamically obtained from a machine characteristics repository. An evaluator node is considered to be healthy if the available memory corresponding to it is greater than or equal to half of the computed required memory and if its processor speed is greater than fifty percent. In an embodiment of the present invention, if none of the evaluator nodes satisfy the sufficient memory and processor requirement then the number of sub-queries that may be formed corresponding to the input query is equal to the total number of evaluator nodes.

In an exemplary embodiment of the present invention, an input query reads as: Select productid, productname from Products;
where 'Products' depicts the name of a table in a database;
In accordance with the statistics maintained by the machine characteristics repository, the total number of evaluator nodes available for processing the input query is 4 and only three out of the 4 evaluator nodes are found to be healthy. Hence, the input query may be fragmented into three sub-queries.

At step 304 the input query is fragmented into multiple sub-queries. The input query is fragmented by adding a filter predicate in a manner such that the semantics of the input query are not altered. The filter predicate is added to the input query by using an active key corresponding to the table and database being referenced by the input query.

At step 306, each sub-query is scheduled on one or more optimizer nodes. In an embodiment of the present invention, the allocation of sub-queries to the query optimizer nodes is done in a Round-Robin fashion. The optimizer nodes are computing devices that generate optimal query plans for execution of the fragmented input query.

At step 308, optimal query execution plans comprising one or more query partitions are generated corresponding to each query. Optimal query plans may be generated by using any of the query plan generation algorithms commonly known in the art. The query plans generated may have one or more query partitions. One or more query partitions are generated since the input query may reference multiple databases dispersed geographically.

At step 310, each of the generated query partitions are scheduled for execution on one or more healthy evaluator nodes. At step 312 the results of all the executed sub-queries, are collated, aggregated and presented in a required format. In an embodiment of the present invention examples of the SQL operations supported comprise Count( ), Sum( ), Min( ), Max( ), Avg( ), Group by ( ) and Order by [asc/desc].

In an exemplary embodiment of the present invention where an input query reads as:
Select Branch, Count(Customerid) From Customers Group by Branch Order by Branch;
and the input query is fragmented into three sub-queries using the active key as Customerid, the sub-queries read as:
Select Branch, Count(Customerid) From Customers where Customerid<=2000 Group by Branch Order by Branch;
Select Branch, Count(Customerid) From Customers where Customer>2000 and Customerid<=3000 Group by Branch Order by Branch; and
Select Branch, Count(Customerid) From Customers where Customerid>3000 Group by Branch Order by Branch;
the result set obtained upon execution of the first sub-query is represented as:

| Branch | Count(Customerid) |
|---|---|
| Bangalore | 150 |
| Chennai | 250 |
| Hyderabad | 600 | the result set obtained upon execution of the second sub-query is represented as:

| Branch | Count(Customerid) |
|---|---|
| Bangalore | 10 |
| Chennai | 250 |
| Hyderabad | 300 |
| Pune | 440 | the result set obtained upon execution of the third sub-query is represented as:

| Branch | Count(Customerid) |
|---|---|
| Chennai | 15 |
| Mysore | 285 |
| Pune | 700 |

Hence, the Collated result set reads as:

| Branch | Count(Customerid) |
|---|---|
| Bangalore | 150 |
| Chennai | 250 |
| Hyderabad | 600 |
| Bangalore | 10 |
| Chennai | 250 |
| Hyderabad | 300 |
| Pune | 440 |
| Chennai | 15 |
| Mysore | 285 |
| Pune | 700 |

Once the collated results are aggregated, the aggregated result set is represented as:

| Branch | Count(Customerid) |
|---|---|
| Bangalore | 160 |
| Chennai | 515 |
| Hyderabad | 900 |
| Mysore | 285 |
| Pune | 1140 |

In another exemplary embodiment of the present invention where an input query reads as:

Select Branch, Count(Customerid) From Customers Group by Branch Order by Branch;

and the input query is fragmented into three sub-queries using the active key as Branch, the sub-queries read as:

Select Branch, Count(Customerid) From Customers where Branch='Bangalore' or Branch='Chennai' Group by Branch Order by Branch;

Select Branch, Count(Customerid) From Customers where Branch='Hyderabad' or Branch='Mysore' Group by Branch Order by Branch; and Select Branch, Count(Customerid) From Customers where Branch='Pune' Group by Branch Order by Branch;

the result set obtained upon execution of the first sub-query is represented as:

| Branch | Count(Customerid) |
|---|---|
| Bangalore | 160 |
| Chennai | 515 | the result set obtained upon execution of the second sub-query is represented as:

| Branch | Count(Customerid) |
|---|---|
| Hyderabad | 900 |
| Mysore | 285 | the result set obtained upon execution of the third sub-query is represented as:

| Branch | Count(Customerid) |
|---|---|
| Pune | 1140 |

Hence, the Collated result set reads as:

| Branch | Count(Customerid) |
|---|---|
| Bangalore | 160 |
| Chennai | 515 |
| Hyderabad | 900 |
| Mysore | 285 |
| Pune | 1140 |

Once the collated results are aggregated, the aggregated result set is represented as:

| Branch | Count(Customerid) |
|---|---|
| Bangalore | 160 |
| Chennai | 515 |
| Hyderabad | 900 |
| Mysore | 285 |
| Pune | 1140 |

Figure 4:
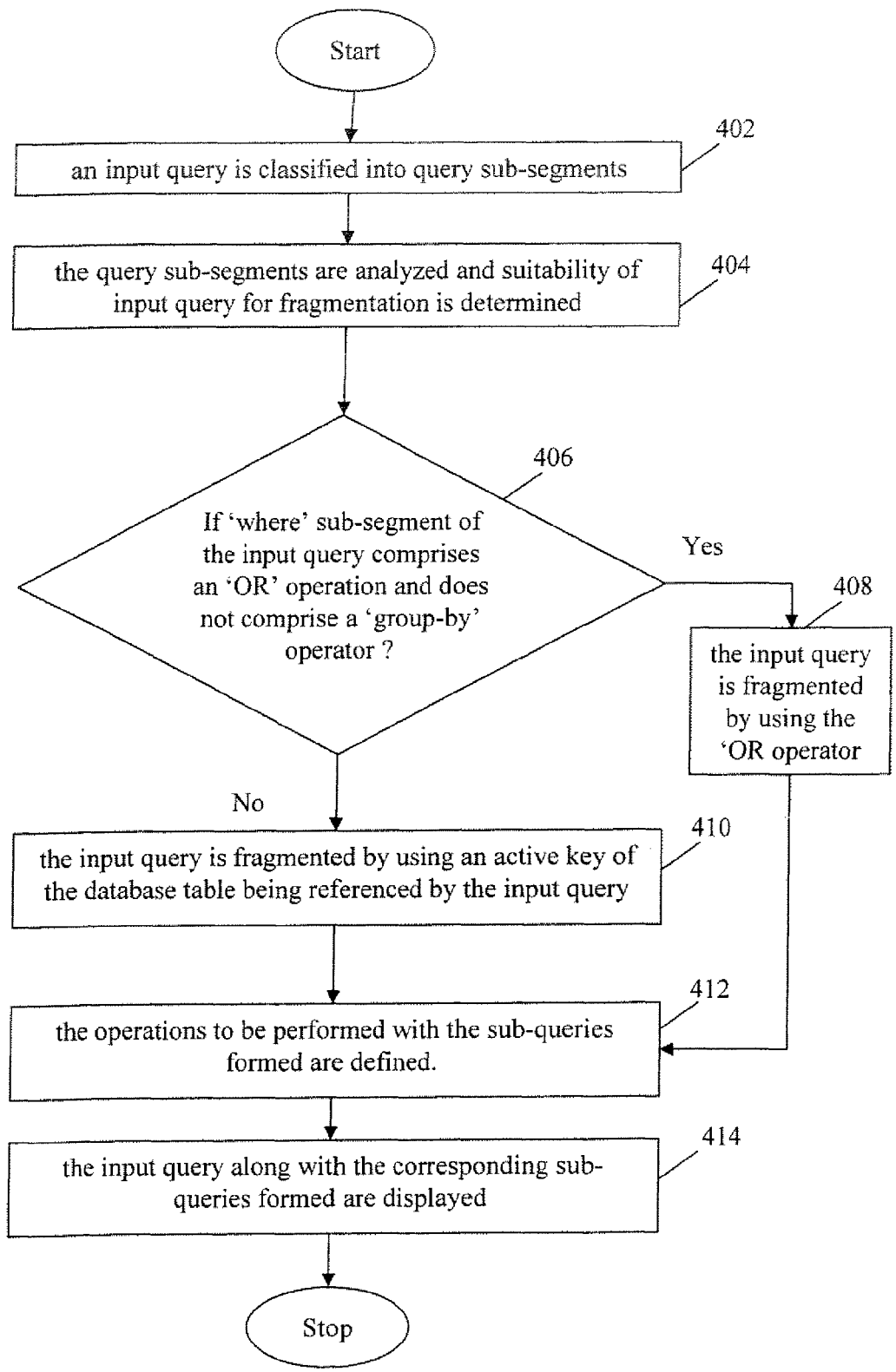
FIG. 4 illustrates a method of fragmenting an input query into multiple sub-queries.

FIG. 4 illustrates a method of fragmenting an input query into multiple sub-queries. At step 402 an input query is classified into query sub-segments. In an embodiment of the present invention, various examples of input SQL queries classified into sub-segments include:
Select [-a-] from [-b-];
Select [-a-] from [-b-] where [-c-];
Select [-a-] from [-b-] where [-c-] group by [-d-];
Select [-a-] from [-b-] where [-c-] group by [-d-] having [-e-];
Select [-a-] from [-b-] where [-c-] order by [-f-];
Select [-a-] from [-b-] where [-c-] group by [-d-] order by [-f-];
Select [-a-] from [-b-] where [-c-] group by [-d-] having [-e-] order by [-f-];
Where,
a depicts 'select' segment;
b depicts 'from' segment;
c depicts 'where' segment;
d depicts 'group by' segment;
e depicts 'having' segment; and
f depicts 'order by' segment.

At step 404 the query sub-segments are analyzed and suitability of input query for fragmentation is determined. In various embodiments of the present invention, step 404 comprises: parsing a 'select' sub-segment to collect the projected attributes of the input query; determining whether a 'having' sub-segment comprises any aggregate function; determining whether only the projected attributes of the input query are used in 'group-by' or 'order-by' or 'having' sub-segments; collecting attributes corresponding to 'where' sub-segment of the input query; parsing 'select' and 'from' sub-segments to collect tablename and any objects if defined for them; determining whether the input query is suitable for fragmenting based upon the collected data.

At step 406 it is determined whether a 'where' sub-segment of the input query comprises an 'OR' operation and does not comprise a 'group-by' operator. At step 408 if it is determined that the 'where' sub-segment of the input query comprises an 'OR' operation, the input query is fragmented by using the 'OR operator. In an embodiment of the present invention, the input query is fragmented either into a predetermined number of sub-queries or the number of fragments is determined based upon the determined suitability of input query for fragmentation.

At step 410 if it is determined that the 'where' sub-segment of the input query does not comprise an 'OR' operation, the input query is fragmented by using an active key of the database table being referenced by the input query. In various embodiments of the present invention, step 410 comprises: obtaining the database name, table name and the active key corresponding to the input query, by accessing a database such as the database characteristics repository described with reference to FIG. 2; If an active key is obtained, determining whether the active key is present in the list of attribute corresponding to the 'where' sub-segment; the active key is present in the list of attribute corresponding to the 'where' sub-segment determining whether the identified 'where' clause predicate is local or join predicate; the 'where' clause predicate is a local predicate; obtaining an alternate active key that is not present in the input query attribute list; determining the range of the obtained active key based on the active key type; determining whether the range is sufficient for splitting the input query into a predetermined number of fragments; if the range is sufficient, then the input query is fragmented into the predetermined number of sub-queries; if range is insufficient the input query is fragmented into a fewer number of sub-queries determined based upon the determined suitability of input query for fragmentation.

At step 412 the operations to be performed with the sub-queries formed are defined. At step 414 the input query along with the corresponding sub-queries formed are displayed. For example, if an input SQL query reads as:
Select branch, count(*) as Cnt from Customers Group by Branch Order by Count(*), Branch;
and the predetermined number of fragments is three, the database name is 'BORACLDB', the table name is 'Customers', the active key type is 'integer' and the range of the active key Cust_id begins at '1000' and ends at '7000';
By using the method illustrated in FIG. 4 the input SQL query may be fragmented into the following sub-queries:
Select Branch, Count(*) as Cnt from Customers where Cust_id <=3000 Group by Branch Order by Count(*), Branch;
Select Branch, Count(*) As Cnt from Customers where Cust_Id>3000 and Cust_Id <=5000 Group by Branch Order by Count(*), Branch; and
Select Branch, Count(*) as Cnt from Customers where Cust_Id>5000 Group by Branch Order by Count(*), Branch;
In another exemplary embodiment of the present invention where an input query reads as:
Select a.Customername, b.Orderdate from Customers as a, Orders as b where a.Cust_id=b.Cust_id;
and the predetermined number of fragments is three, the database names are 'BORACLDB' and 'MYSQLDB'; the base database name is 'BORACLDB', and the selected table name is 'Customers', the active key type is 'integer' and the range of active key Cust_id begins at '1000' and ends at '7000'.
By using the method illustrated in FIG. 4 the input SQL query may be fragmented into the following sub-queries:
Select a.Customername, b.Orderdate from Customers as a, Orders as b where a.Cust_id=b.Cust_id and a.Cust_id<=3000 and b.Cust_id<=3000;
Select a.Customername, b.Orderdate from Customers as a, Orders as b where a.Cust_id=b.Cust_id and a.Cust_id>3000 and a.Cust_id<=5000 and b.Cust_id>3000 and b.Cust_id<=5000; and
Select a.Customername, b.Orderdate from Customers as a, Orders as b where a.Cust_id=b.Cust_id and a.Cust_id>5000 and b.Cust_id>5000;
Therefore the present invention provides a system, a method and a computer program product for parallel query processing. The present invention does not require under lying databases being referenced by the input queries to be partitioned. Hence, the system and method of the present invention enables real-time data integration from disparate and heterogeneous data sources.

While the exemplary embodiments of the present invention are described and illustrated herein, it will be appreciated that they are merely illustrative. It will be understood by those skilled in the art that various changes in form and detail may be made therein without departing from or offending the spirit and scope of the invention as defined by the appended claims.

We claim:
1. A system for parallel query processing comprising:
   a. a query fragment identifier module for estimating a number of sub-queries that may be formed corresponding to an input search query for searching a database, the input search query based on a number of query evaluator nodes available for processing the input search query and processing characteristics of the available query evaluator nodes, the query evaluator nodes accessing one or more databases being referenced by the input search query for processing the input search query;
   b. a query splitter module for fragmenting the input search query into a plurality of distinct sub queries by adding to the input search query, one or more filter predicates that were not part of the input search query, wherein each sub query includes a string representing the entire input search query and additionally including at least one of the one or more filter predicates, such that each of the plurality of sub-queries is distinguishable from other sub-queries within the plurality;
   c. a scheduler for scheduling the processing of the sub queries;
   d. a result aggregator module for aggregating results of the processed sub queries;
   e. a streaming module for streaming results of the processed sub queries; and
   f. a metadata manager for storing processing characteristics of the one or more query evaluator nodes and information regarding the one or more databases being referenced by the search input query.
2. The system as claimed in claim 1 further comprises a plurality of query optimizer nodes for generating optimal query plans comprising one or more query partitions for processing the fragmented input search query.
3. The system as claimed in claim 1 wherein the input query is written in a structured search query language.
4. The system as claimed in claim 1 wherein the query fragment identifier module estimates the number of sub-queries that may be formed corresponding to the input search query as equal to a number of healthy query evaluator nodes available for processing the input search query; a query evaluator node being selected as healthy if memory available at the evaluator node is greater than or equal to half a memory requirement for storing all records of a predetermined table of a predetermined database being referenced by the input search query and if processing speed of the evaluator node is greater than a predetermined threshold.
5. The system as claimed in claim 1 wherein the scheduler schedules the sub queries for processing by using a round robin algorithm.
6. The system as claimed in claim 1 wherein the metadata manager is updated periodically and comprises a machine characteristics repository and a database characteristics repository.
7. The system as claimed in claim 6 wherein the database characteristics repository stores physical and logical meta- data information corresponding to the one or more databases being referenced by the input search query; logical metadata information comprising information regarding schema of the one or more databases being referenced by the input search query; physical metadata information comprising information regarding statistics of the one or more databases being referenced by the input search query.

8. The system as claimed in claim 6 wherein the database characteristics repository stores names of the one or more databases being referenced by the input search query, names of the one or more tables being referenced by the input search query, attribute names obtained from the one or more tables being referenced by the input search query as active keys, data types of the active keys, and ranges of the active keys.

9. A method for parallel query processing comprising:
   a. estimating a number of sub-queries that may be formed corresponding to an input search query for searching a database;
   b. fragmenting the input search query into a plurality of distinct sub queries by adding to the input search query, one or more filter predicates that were not part of the input search query, wherein each sub query includes a string representing the entire input search query and additionally includes at least one of the one or more filter predicates, such that each of the plurality of sub-queries is distinguishable from other sub-queries within the plurality;
   c. scheduling the processing of the sub queries;
   d. generating one or more query execution plans comprising one or more query partitions corresponding to each sub query;
   e. processing the generated one or more query execution plans; and
   f. collating, aggregating and presenting results of the processed sub queries in a required format.

10. The method as claimed in claim 9 further comprising the step of streaming the results of the processed subqueries in a required format.

11. The method as claimed in claim 9 wherein the step of estimating a number of sub-queries that may be formed corresponding to an input search query comprises the steps of:
   a. parsing the input search query and extracting one or more query attributes for obtaining references to one or more databases and tables corresponding to the input search query;
   b. selecting a first database that corresponds to at least one of the extracted attributes and table combination as a base database;
   c. selecting a table from the base database based on a number of records contained in the table;
   d. computing memory required for storing the selected table;
   e. obtaining available memory and processing speed of each evaluator node available for processing the input search query;
   f. selecting an evaluator node available for processing the input search query as a healthy evaluator node if the available memory corresponding to the evaluator node is greater than or equal to half of the computed and if the processing speed of the evaluator node is greater than a predetermined threshold; and
   g. estimating a number of sub-queries that may be formed corresponding to the input search query as the number of selected healthy evaluator nodes.

12. The method as claimed in claim 9 wherein the step of fragmenting the input search query into a plurality of sub queries further comprises the steps of:
   a. classifying the input search query into query sub-segments;
   b. determining suitability of the input search query for fragmentation by analyzing the query sub-segments;
   c. determining if a 'where' sub-segment of the input search query comprises an 'OR' operation and does not comprise a 'group-by' operator;
   d. fragmenting the input search query into one or more sub queries by using the 'OR' operator if the 'where' sub-segment of the input search query comprises an 'OR' operation and does not comprise a 'group-by' operator; and
   e. fragmenting the input search query into one or more sub queries by using an active key of the database table being referenced by the input search query if the 'where' sub-segment of the input search query comprises an 'OR' operation and does not comprise a 'group-by' operator.

13. A non-transitory computer usable medium having a computer readable program code embodied therein for parallel query processing, the computer readable program code comprising instructions for:
   a. estimating a number of sub-queries that may be formed corresponding to an input search query for searching a database;
   b. fragmenting the input search query into a plurality of distinct sub queries by adding to the input search query, one or more filter predicates that were not part of the input search query, wherein each sub query includes a string representing the entire input search query and additionally includes at least one of the one or more filter predicates, such that each of the plurality of sub-queries is distinguishable from other sub-queries within the plurality;
   c. scheduling the processing of the sub queries;
   d. generating one or more query execution plans comprising one or more query partitions corresponding to each sub query;
   e. processing the generated one or more query execution plans; and
   f. collating, aggregating and presenting results of the processed sub queries in a required format.

14. The non-transitory computer readable medium as claimed in claim 13 further comprising streaming the results of the processed sub queries in a required format.

15. The non-transitory computer readable medium as claimed in claim 13 wherein estimating a number of sub-queries that may be formed corresponding to an input search query further comprises:
   a. parsing the input search query and extracting one or more query attributes for obtaining references to one or more databases and tables corresponding to the input search query;
   b. selecting a first database that corresponds to at least one of the extracted attributes and table combination as a base database;
   c. selecting a table from the base database based on a number of records contained in the table;
   d. computing memory required for storing the selected table;
   e. obtaining available memory and processing speed of each evaluator node available for processing the input search query;
   f. selecting an evaluator node available for processing the input search query as a healthy evaluator node if the available memory corresponding to the evaluator node is greater than or equal to half of the computed and if the processing speed of the evaluator node is greater than a predetermined threshold; and g. estimating a number of sub-queries that may be formed corresponding to the input search query as the number of selected healthy evaluator nodes.

16. The non-transitory computer readable medium as claimed in claim 13 wherein fragmenting the input search query into a plurality of sub queries further comprises:
   a. classifying the input search query into query sub-segments;
   b. determining suitability of the input search query for fragmentation by analyzing the query sub-segments;
   c. determining if a 'where' sub-segment of the input search query comprises an 'OR' operation and does not comprise a 'group-by' operator;
   d. fragmenting the input search query into one or more sub queries by using the 'OR' operator if the 'where' sub-segment of the input search query comprises an 'OR' operation and does not comprise a 'group-by' operator; and
   e. fragmenting the input search query into one or more sub queries by using an active key of the database table being referenced by the input search query if the 'where' sub-segment of the input search query comprises an 'OR' operation and does not comprise a 'group-by' operator.

* * * * *

UNITED STATES PATENT AND TRADEMARK OFFICE
CERTIFICATE OF CORRECTION

PATENT NO. : 8,386,508 B2
APPLICATION NO. : 12/431296
DATED : February 26, 2013
INVENTOR(S) : Srikumar Krishnamoorthy et al.

It is certified that error appears in the above-identified patent and that said Letters Patent is hereby corrected as shown below:

On the Title Page
Item [57], line 1, "is" should read --are--
Item [57], line 5, after "sub" insert -- - --
Item [57], line 7, after "sub" insert -- - --
Item [57], line 10, after "sub" insert -- - --

In the Specification
Column 1, line 37, delete "while"
Column 1, line 44, "does" should read --do--
Column 1, line 61, after "sub" insert -- - --
Column 1, line 64, after "sub" insert -- - --
Column 1, line 65, after "sub" insert -- - --
Column 1, line 66, after "sub" insert -- - --
Column 2, line 21, after "sub" insert -- - --
Column 2, line 21, after "round" insert -- - --
Column 2, line 45, after "sub" insert -- - --
Column 2, line 47, after "sub" insert -- - --
Column 2, line 49, after "sub" insert -- - --
Column 2, line 53, after "sub" insert -- - --
Column 3, line 1, "the computed" should read --the computed memory--
Column 3, line 7, after "sub" insert -- - --
Column 3, line 14, after "sub" insert -- - --
Column 3, line 18, after "sub" insert -- - --
Column 3, line 30, "structure of" should read --structure of a--
Column 3, line 55, "is" should read --are--
Column 4, line 40, "is" should read --are--
Column 4, line 66, "is" should read --are--
Column 6, line 47, "is" should read --are--
Column 7, line 37, delete ","

Signed and Sealed this
Fourteenth Day of April, 2015

Michelle K. Lee
*Director of the United States Patent and Trademark Office*

CERTIFICATE OF CORRECTION (continued)
U.S. Pat. No. 8,386,508 B2

Column 8, line 12, "are" should read --is--
Column 8, line 14, delete ","
Column 11, line 8, "attribute" should read --attributes--
Column 11, line 10, "attribute" should read --attributes--
Column 12, line 1, after "under" insert -- - --
Column 12, line 4, "enables" should read --enable--

In the Claims
Column 12, line 24, after "sub" insert -- - --
Column 12, line 26, after "sub" insert -- - --
Column 12, line 32, after "sub" insert -- - --
Column 12, line 35, after "sub" insert -- - --
Column 12, line 37, after "sub" insert -- - --
Column 12, line 60, after "sub" insert -- - --
Column 13, line 20, after "sub" insert -- - --
Column 13, line 22, after "sub" insert -- - --
Column 13, line 28, after "sub" insert -- - --
Column 13, line 31, after "sub" insert -- - --
Column 13, line 35, after "sub" insert -- - --
Column 13, line 37, after "sub" insert -- - --
Column 13, line 59, "of the computed" should read --of the computed memory--
Column 13, line 66, after "sub" insert -- - --
Column 14, line 8, after "sub" insert -- - --
Column 14, line 13, after "sub" insert -- - --
Column 14, line 25, after "sub" insert -- - --
Column 14, line 27, after "sub" insert -- - --
Column 14, line 33, after "sub" insert -- - --
Column 14, line 36, after "sub" insert -- - --
Column 14, line 40, after "sub" insert -- - --
Column 14, line 43, after "sub" insert -- - --
Column 14, line 65, "of the computed" should read --of the computed memory--
Column 15, line 6, after "sub" insert -- - --
Column 16, line 1, after "sub" insert -- - --
Column 16, line 6, after "sub" insert -- - --